US009512818B2

(12) United States Patent
Richtman et al.

(10) Patent No.: US 9,512,818 B2
(45) Date of Patent: Dec. 6, 2016

(54) LOW-COST MOLDED WIND TURBINE BLADE

(71) Applicant: Pika Energy LLC, Westbrook, ME (US)

(72) Inventors: Keith Thomas Richtman, Boston, MA (US); Benjamin Francis Polito, Gorham, ME (US); Joshua Daniel Kaufman, Gorham, ME (US)

(73) Assignee: Pika Energy LLC, Westbrook, ME (US)

( * ) Notice: Subject to any disclaimer, the term of this patent is extended or adjusted under 35 U.S.C. 154(b) by 746 days.

(21) Appl. No.: 13/744,246

(22) Filed: Jan. 17, 2013

(65) Prior Publication Data

US 2013/0183161 A1 Jul. 18, 2013

Related U.S. Application Data

(60) Provisional application No. 61/588,075, filed on Jan. 18, 2012.

(51) Int. Cl.
*F03D 1/06* (2006.01)

(52) U.S. Cl.
CPC ..... *F03D 1/0675* (2013.01); *F05B 2280/4007* (2013.01); *Y02B 10/30* (2013.01); *Y02E 10/721* (2013.01)

(58) Field of Classification Search
CPC .......... F03D 1/06; F03D 1/065; F03D 1/0658; F03D 1/0666; F03D 1/0675; F05B 2280/4007; B29D 99/0028
See application file for complete search history.

(56) References Cited

U.S. PATENT DOCUMENTS

| 4,698,011 | A | * | 10/1987 | Lamalle | B29C 33/48 249/178 |
| 4,720,244 | A | * | 1/1988 | Kluppel | B29C 70/02 416/224 |
| 4,863,117 | A | * | 9/1989 | Riout | B64C 33/02 244/219 |
| 6,158,278 | A | * | 12/2000 | Klinefelter | F03D 3/065 73/170.05 |
| 8,007,705 | B2 | * | 8/2011 | Sanderson | B29C 33/505 264/230 |
| 2003/0141721 | A1 | * | 7/2003 | Bartlett | F03D 1/0675 290/55 |
| 2006/0257240 | A1 | * | 11/2006 | Naskali | F03D 3/04 415/4.4 |
| 2009/0324412 | A1 | * | 12/2009 | Roorda | F03D 1/0658 416/204 R |

* cited by examiner

Primary Examiner — Christopher Verdier
Assistant Examiner — Brian O Peters
(74) Attorney, Agent, or Firm — Schwegman Lundberg & Woessner, P.A.

(57) ABSTRACT

An optimally-shaped single part molded wind turbine blade is provided for small wind turbines. Two mold bodies are brought together to form a cavity, and a third retractable mold body is inserted into the cavity. A flowable material such as filled thermoplastic resin is introduced into the space between the mold bodies and solidified. The retractable mold body is retracted and the mold is opened to reveal a single-part wind turbine blade with a hollow root region.

15 Claims, 6 Drawing Sheets

LOW-COST MOLDED WIND TURBINE BLADE

RELATED APPLICATION

This application claims priority to U.S. Provisional Application Ser. No. 61/588,075 (entitled Low-Cost Molded Wind Turbine Blade, filed Jan. 18, 2012) which is incorporated herein by reference.

BACKGROUND

Wind turbines as a source of electrical power are rapidly gaining importance worldwide. The blades (airfoils) are one of the more costly and technically demanding subcomponents of a wind turbine. For best aerodynamic performance, wind turbine blades require a complex shape incorporating continuously variable twist and taper from the central hub to the outer tip. The high power output of megawatt-class utility scale wind turbines justifies production of complex glass fiber composite blades requiring a significant amount of skilled manual labor.

However, this labor-intensive blade manufacturing approach is ill-suited to mass-producing economic blades for small home-scale wind turbines. One prior art approach is to manufacture constant-section blades by pultrusion of glass-reinforced thermoset polymer, but this approach cannot deliver the optimum tapered, twisted blade shape. Small blades 1 meter or less in length may be readily and efficiently produced by automated injection molding as a single solid part, but this process is ill-suited to longer blades, since injection molding does not work well with thick cross sections that occur in root (inboard) regions. Somewhat longer blades may be produced by injection or compression molding of two separate blade halves corresponding to low and high pressure surfaces of the blade, which are subsequently bonded together with adhesive to form a single hollow blade. However, this approach requires purchase of two full-sized molds instead of one, skilled labor is required to assemble the two halves correctly, and the requirement of adhesive compatibility limits the choice of resins that may be used.

SUMMARY

A single-part wind turbine blade with an internal cavity in the thick inboard region is produced by automatic injection molding. A mold consisting of two female mold halves are provided in an injection molding machine to define the shapes of the suction and pressure sides of the blade. A removable tapered male mold portion is provided which extends radially outward into the volume defined between the two mold halves, and heated thermoplastic resin is introduced to fill the space between the male and female mold portions. Once the resin has cooled and solidified, the male mold portion is removed and the female mold portions are separated to release a finished single part hollow blade.

DETAILED DESCRIPTION

Figure 1A:
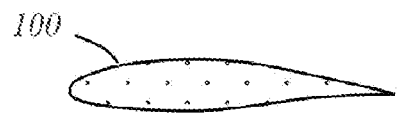
FIGS. 1A, 1B, 1C, and 1D illustrate Prior Art blades.
Figure 1B:
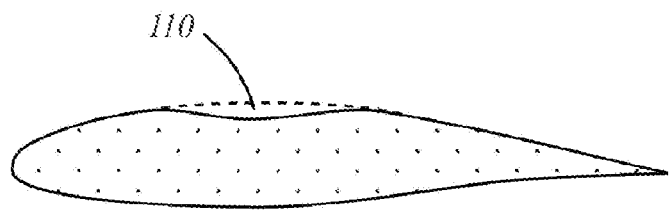
Figure 1C:
Figure 1D:
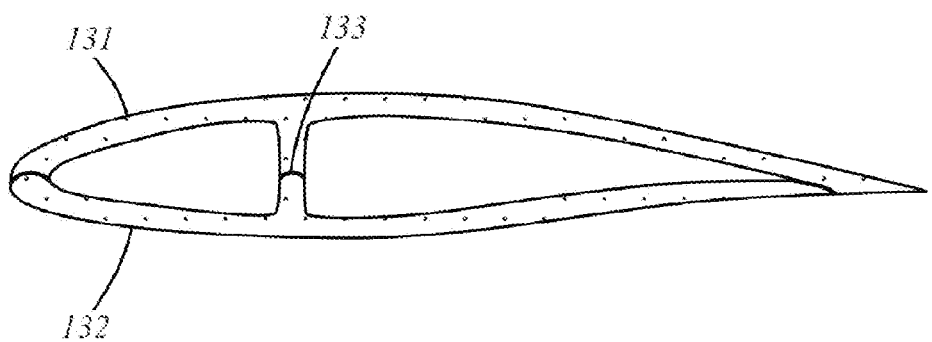

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The design for manufacture of wind turbine blades presents a significant engineering challenge. First, one or more airfoil shapes must be selected. Basic airfoils for various size classes of wind turbines are known in the art, and are available from sources including the US National Renewable Energy Lab (NREL). An efficient external three-dimensional shape (planform), typically incorporates variable chord (distance from leading edge to trailing edge of the airfoil shape) and twist (rotation of the airfoil shape about the long axis of the blade) as a function of radial (spanwise) position along the long axis of the blade. Aerodynamic performance data for various airfoils from wind tunnel studies is available in the form of tabulated lift and drag values as a function of angle of attack, from sources including the Selig group at the University of Illinois. Given aerodynamic performance data, a suitable planform may be devised by selecting the chord and twist for maximum energy capture. Software simulation tools for use in developing a suitable planform are also known, for instance the WT-Perf and FAST codes produced by the National Wind Technology Center. Typically, an efficient design will feature chord that is widest near the root and tapers continually to a narrow tip, and twist that is near zero angle at the tip, and increases to over 10 degrees near the root.

While blade planform may be optimized from an aerodynamic perspective without reference to blade manufacturing methods, in practical designs the blade planform may be a compromise between aerodynamic performance and manufacturing considerations. For instance, in large blades, structural considerations outweigh aerodynamic performance near the root of the blade (the end nearest the hub), and the designer may choose to transition the cross-section of the blade to a circular shape, despite the poor aerodynamic performance of this form. Further adjustments may be made to improve strength, moldability, or appearance.

Ease of manufacturing and minimization of labor input are especially important in small wind turbines of a size appropriate to serve a home or farm. With reference to Prior Art FIGS. 1A, 1B, 1C, and 1D, injection molding is a known technique for manufacturing small single-part wind turbine blades 100 up to approximately 1 meter in length. Suitable thermoplastic resins include glass fiber filled polypropylene, glass fiber filled polyester, and carbon fiber filled polyester. However, injection molding is less well-suited to production of longer blades, for several reasons. In-mold cooling time scales with the second power of part thickness, so the greater thickness required for strength and aerodynamic performance in the inboard (root) portions of longer blades leads to long in-mold cooling times and thus high costs, as fewer blades per unit of time may be produced by each mold. Thick solid sections of larger blades use large quantities of costly resin, and are difficult to mold, leading to deformation or 'sinks' 110 and/or voids 120 in the thick regions, and resulting in poor mechanical strength. Designers are thus driven to design blades with root portions that are thinner, narrower, and weaker than aerodynamics and structural considerations would otherwise dictate.

One approach is to mold the blade as two half shell sections 131, 132 by injection molding or compression-molding of thermoplastic or thermoset resin, with mating features 133, and subsequently join the sections together with adhesive. However this approach requires two costly full-size molds instead of one, and also requires subsequent hand labor to assemble the two blade halves, along with the risk of rupture from adhesive failure at the bond line.

Various embodiments are described. In one embodiment, low-cost manufacture of aerodynamically-optimized single-part wind turbine blades may be performed using economical thermoplastic resins. In some embodiments, an economical, automatic method produces blades in the range of 1-2 meters in length with favorable aerodynamic profiles and efficient use of inexpensive, durable materials.

Figure 2A:
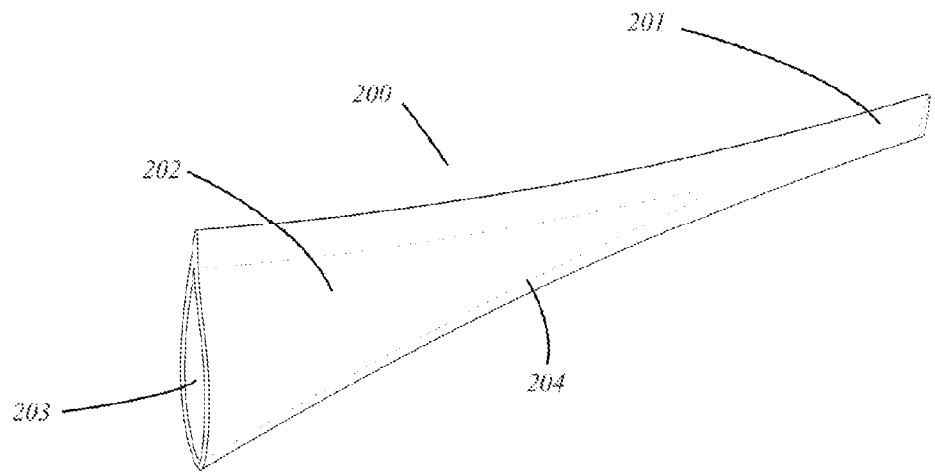
FIG. 2A is a perspective view of a blade according to an example embodiment.

In one embodiment, illustrated in FIG. 2A, a wind turbine blade 200 is provided with a solid, tipward portion 201 and a hollow, rootward portion 202 which is made hollow by cavity 203. The blade may be produced by injection molding, compression molding, resin transfer molding, or another suitable low-cost molding process. The three-dimensional surface 204 that defines cavity 203 may be designed with a continuous taper from the tipward end to the rootward end.

Figure 2B:
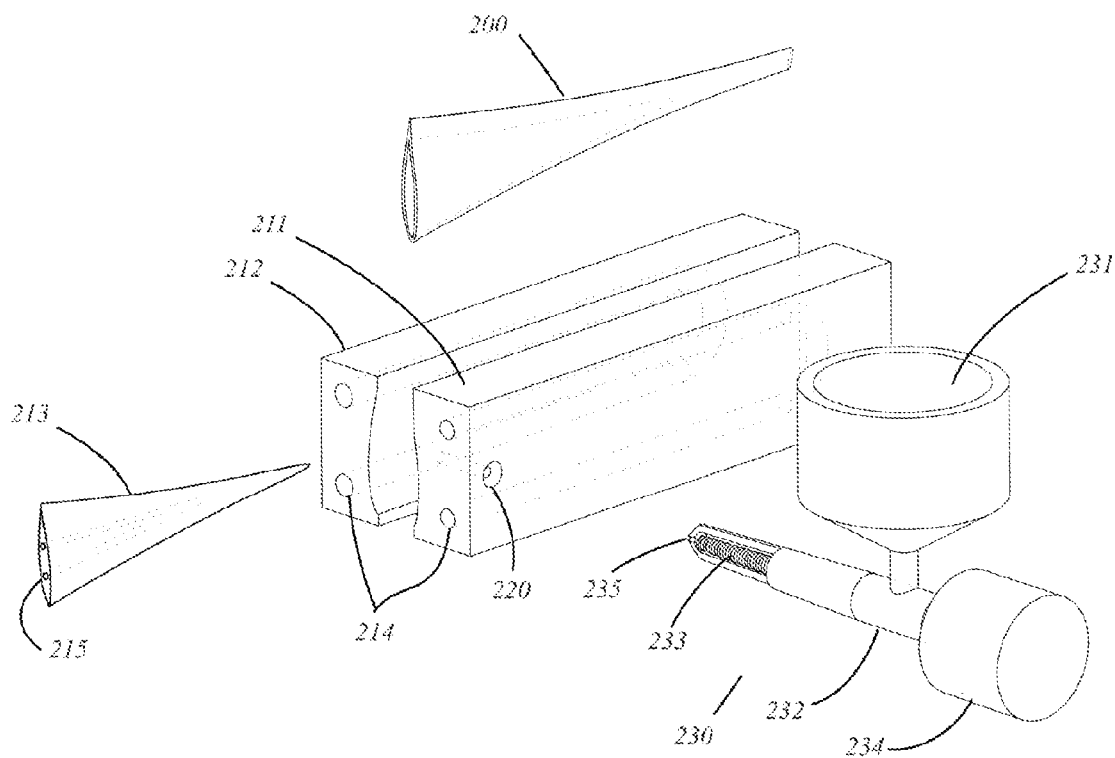
FIG. 2B is a perspective view of a blade and molding process according to an example embodiment.

An apparatus for producing blade 200 is illustrated in FIG. 2B. The outer shape is defined by first and second mold bodies 211 and 212, mounted in an injection molding machine (press) which is capable of opening and closing the mold, and applying sufficient pressure to perform the molding process. The mold bodies may be machined from prehardened steel such as P20, or another suitable injection mold tool material. Aluminum may be used for low-cost, short-run tools. A third, retractable mold body or core 213 is provided to form the internal cavity of blade 200. Core 213 may be constrained to move in a direction substantially perpendicular to the action of the injection molding press, and may be mounted to a slide, hydraulic ram, or similar suitable actuating mechanism.

In operation, mold bodies 211 and 212 may be urged together by suitable clamping means, and retractable mold body 213 introduced between them, thereby forming a closed cavity. Flowable resin may be introduced into the cavity and solidified, whether by cooling or by chemical cure, thereby forming a solid part which may subsequently be released by retracting body 213 and separating mold bodies 211 and 212.

By this method, a high-quality aerodynamic blade may be produced quickly and with a practical minimum of material. The required amount of resin and the maximum thickness of the part are both significantly lower than would be required for a solid blade of the same length, and thus both material and manufacturing cost are substantially decreased. More specifically, in the case of injection molding, the maximum thickness is decreased by at 2-3× or more, resulting in decreased in-mold cooling time by up to 10× or more. Additionally, the reduced thickness reduces voids, sinks, and other imperfections.

The mold bodies 211, 212 that define the cavity of the mold may be provided with internal cooling channels 214 to admit the flow of water or other cooling medium to maintain mold temperature and draw away the heat that is introduced into the mold during continual operation. Internal mold body 213 may likewise be provided with internal cooling channels 215 to admit the flow of water or other coolant to maintain the desired temperature. Internal mold body 213 may be fabricated from commercially-available hard copper alloys such as 'Moldmax' for increased heat transfer. One or more pairs of opposing pins may be provided on mold bodies 211, 212 and projecting inward toward body 213, to stabilize the position of body 213 as the resin is injected quickly under high pressure. The pins may preferably be elongated along the long axis of the blade to facilitate knitting of the flow around the pins, to avoid creating a weak spot. These pins may leave small openings in the finished part, which may be subsequently plugged or caulked.

At least one port 220 may be provided at or near the root end communicating with an opening or 'gate' into the cavity, to allow injection of molten resin by resin injection system 230. The resin injection system includes a hopper 231 carrying pellets of resin. The resin is selected from a variety of commercially available products, based on strength, stiffness, weather and UV resistance, appearance, and cost. One suitable material is UV-stabilized 30% glass-filled polypropylene.

Resin pellets from hopper 231 are introduced into heated barrel 232, which houses a tapered, helical screw 233 driven by drive system 234. The resin injection system is mounted so as to permit periodic rapid injection of molten resin to port 220 via nozzle 235. In some embodiments, multiple gates may be positioned at intervals along the surface of the blade to aid filling the mold. The gates may be individually actuated to optimize the flow direction, for instance to maintain longitudinal fiber orientation while enhancing packing of the mold.

A hot runner system consisting of heated, high pressure conduits may be adapted to convey molten resin from the resin injection system to the point of injection into the cavity. Various other resin injection systems may be used in further embodiments.

Once the external shape of the blade is established, the shape of the internal cavity 203 may be determined. In various embodiments, the internal mold element 213 may be continuously tapered at a minimum allowable draft angle determined by the molding process (or at a greater angle) to allow its removal from the finished molded blade, and the walls may be of sufficient thickness to provide the blade with the necessary degree of strength to prevent rupture or buckling under load. Subject to these constraints, the designer will generally seek to reduce the amount of polymer required to a practical minimum.

Figure 3A:
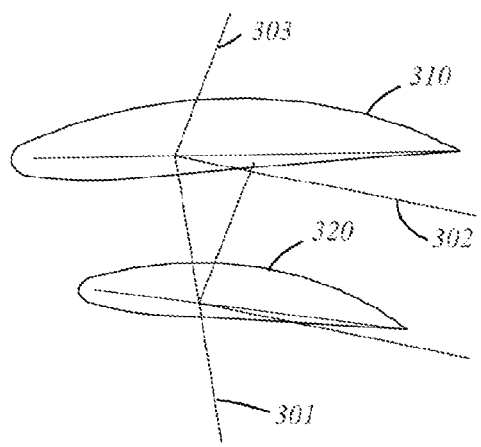
FIGS. 3A, 3B, 3C, 3D, and 3E illustrate various airfoil cross-sections of a blade for which the cavity shape will be determined according to an example embodiment.

FIG. 3A illustrates two airfoil cross-sections 310, 320 of a blade for which the cavity shape will be determined. The stations are positioned along the longitudinal layout axis 301 of the blade with the tip downward, and the cross-sections have variable twist angle with respect to the plane of rotation, which passes through axes 302. Orthogonal axes 303 extend downwind from the layout axis. Station 310 has greater chord and greater twist compared to station 320.

Figure 3B:
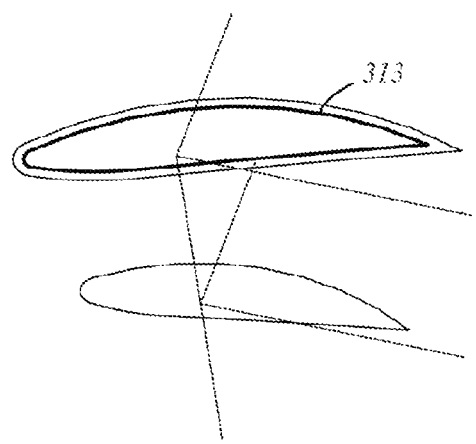

With reference to FIG. 3B, starting at the inward most station 310, the designer may determine the profile defining the cavity at station 310, for instance by applying a minimum wall thickness offset inward from the station profile 310 to produce cavity profile 313. While a constant wall thickness is illustrated, variable wall thickness may be preferable in some cases.

Figure 3C:
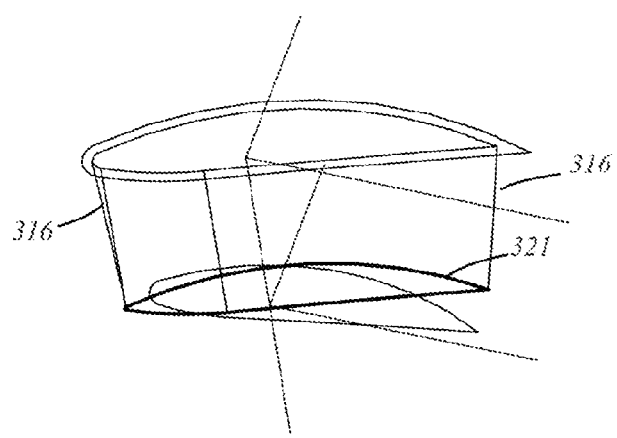

With reference to FIG. 3C, the first cavity profile 313 is projected with the prescribed draft angle (lines 316) onto the plane of the second station to produce drafted profile 321, representing the restriction on the cavity imposed by the requirement for draft.

Figure 3D:
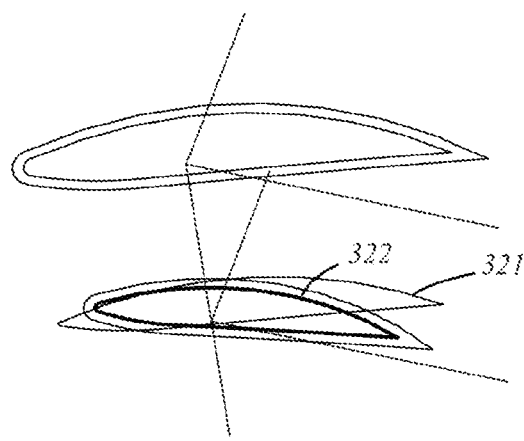

Next, with reference to FIG. 3D, a minimum wall thickness offset is applied to the external profile of the second station 320 to produce a second offset profile 322.

Figure 3E:
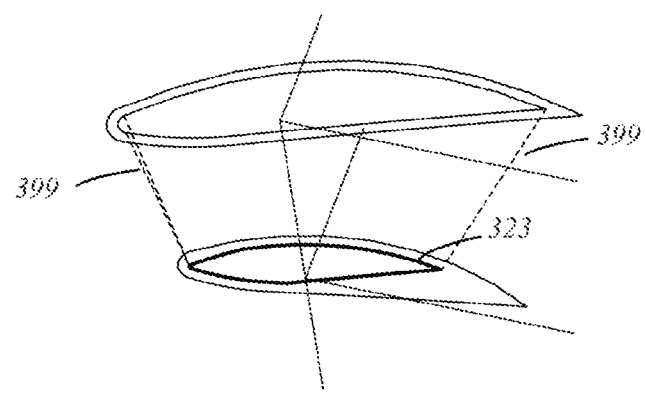

Finally, with reference to FIG. 3E, the actual cavity profile at station 310 is then determined by combining profiles 321 and 322, taking at all points the inward most curve to produce cavity profile 323, which simultaneously satisfies the requirements of minimum draft angle between stations and minimum wall thickness at each station. The procedure is then repeated from station 320 to the next tipward station, until the cavity profile reaches a minimum practical thickness, whereupon the cavity shape is truncated. The final core profiles (313, 323, etc) are then lofted (as illustrated by loft lines 399) to form the final cavity shape.

The foregoing procedure may be automated by software for rapid determination of the cavity shape. The procedure above does not explicitly guarantee that a minimum wall thickness will be realized, because of local concavities in the external shape, but if the stations are close together relative to the local curvature of the blade, the result will be close enough for engineering purposes.

While the procedure of FIGS. 3A, 3B, 3C, 3D, and 3E will define a core shape that may be successfully retracted from the finished blade with a linear motion, other core shapes are possible. For instance, a hollow curved blade may be formed by a core that is removed in an arcuate motion, and a hollow twisted blade may be formed by a core that is removed in a helical motion. For some external blade shapes, these alternate procedures may result in a lower-weight part.

While the methods described above include separation of the first and second mold bodies when releasing the finished part, in some cases a blade geometry may be developed which may be extracted via the rootward end without separating the first and second mold bodies—i.e. even if the mold bodies were fused together, or a single part.

Figure 4:
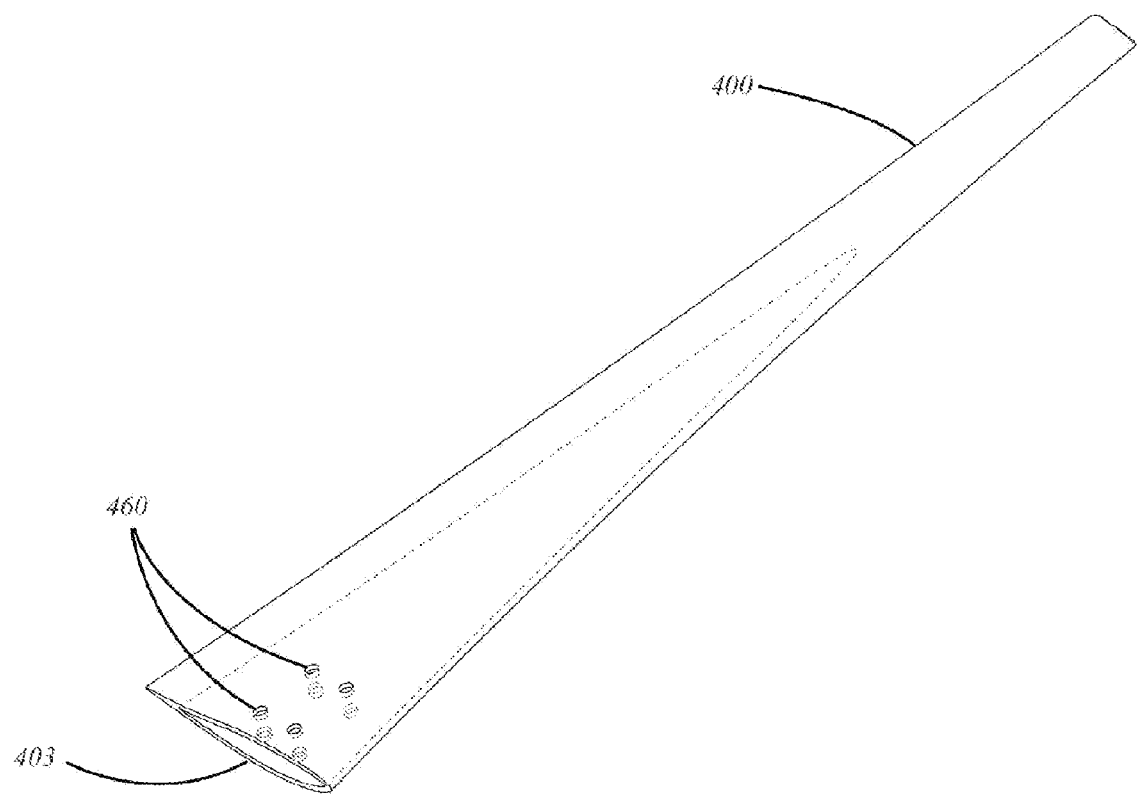
FIG. 4 is a perspective view of a resulting blade profile according to an example embodiment.

The external and internal blade profiles are illustrated in FIG. 4 and may be imported into a commercial 3D modeling program, which can be used to create a 3D solid model of the blade, determine its strength via Finite Element Analysis, and design suitable mold components. Injection mold filling simulation software can be used to assess the mold filling properties of the design, with the results used to iterate the design process described above toward a suitable design. While the above procedure captures the essence of the process to develop the cavity shape, the designer may wish to adapt the process, for instance by introducing variable wall thickness according to Finite Element Analysis of strength or mold filling requirements, by varying the draft angle, or by introducing internal ribs. The resulting solid models can then be used by tool and die makers to produce mold bodies 211, 212, 213.

Blade 400 has a cavity 403 formed by molding as described above. Blade 400 incorporates molded-in mounting features that facilitate attachment to a central hub. For instance, in this case holes 460 are arranged in a pattern molded into each side of the blade at the open (root) end, such that the blade may be bolted or through-clamped to a suitably formed hub. Alternatively, mounting features, such as holes 460, may be provided in a post-process, for instance by CNC drilling of the plastic material. In some embodiments, it may be beneficial to seal the internal cavity to prevent ingress of moisture and a resulting out-of-balance condition. This may be accomplished by filling the cavity with castable low-density foam, or by bonding a molded plug into the opening.

Figure 5A:
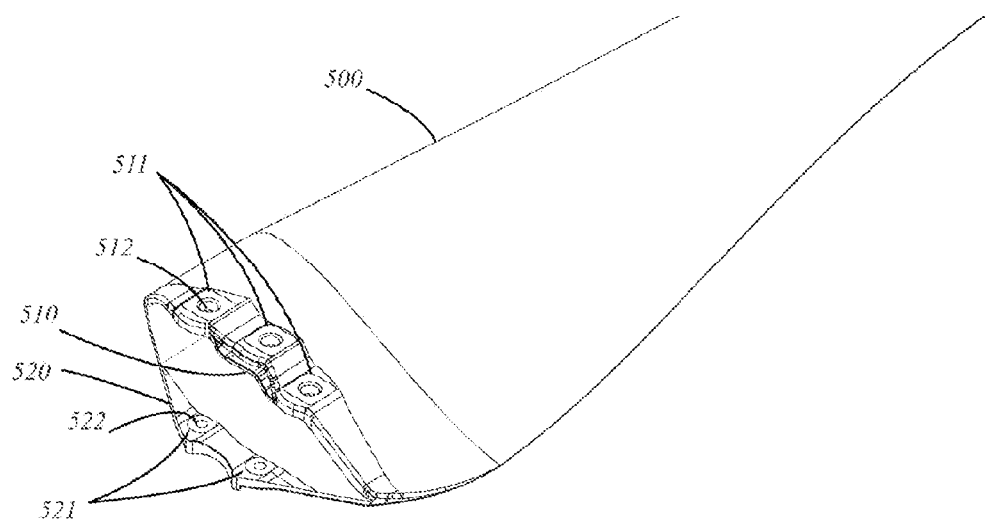
FIGS. 5A, 5B, and 5C illustrate perspective views of a blade and a mounting arrangement according to an example embodiment.
Figure 5B:
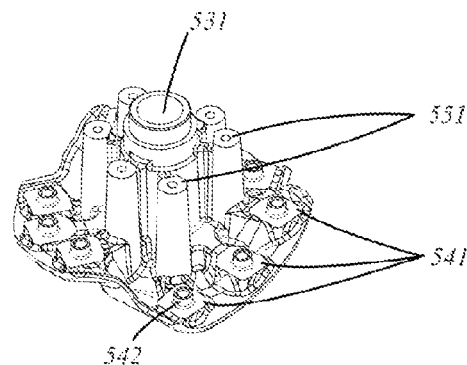
Figure 5C:
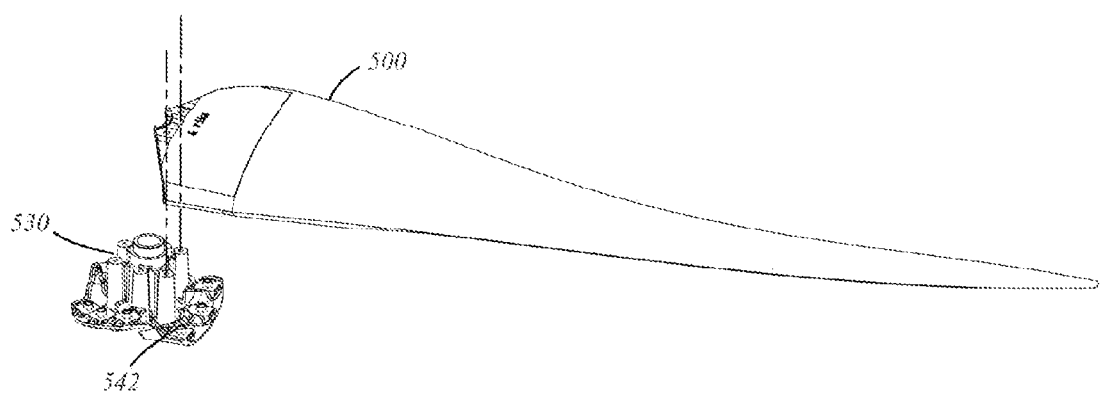

In one embodiment, the rootward end of the blade may be configured in a readily moldable shape that interfaces directly to a suitably formed hub. With reference to FIGS. 5A, 5B, and 5C the rootward end of the blade 500 consists of upwind side 510 and downwind side 520, with the downwind side extending further toward the central axis of rotation. Sides 510 and 520 may be provided with one or more surfaces 511, 521 that are aligned parallel to the plane of rotation, and these surfaces may be provided with holes 512, 522 for alignment and secure attachment to a hub.

With reference to FIG. 5B, mating hub 530 with bore 531 for attachment to the turbine mainshaft may be configured to receive three blades produced by the methods described herein, and may be provided with one or more surfaces 541, 551 that are aligned parallel to the plane of rotation, and optionally with bosses 542 to mate with holes 512.

In assembly, each blade 500 is positioned relative to the hub 530 as shown in FIG. 5C, and lowered onto the hub with bosses 542 mating with holes 512. Fasteners may be provided to secure the blade securely to the hub. Hub 530 may be designed so as to be readily cast from aluminum, steel, or another suitable alloy, and its shape may be chosen such that the necessary interface features may be readily machined in a single setup. Other blade-hub interfaces may be devised, including for instance a system of ridges or tangs on the external surfaces of the blade, while maintaining the moldability of the blade.

EXAMPLES

1. An example method of forming a wind turbine blade, the method comprising:
   bringing a first mold body into proximity with a second mold body;
   positioning a a third, retractable mold body between the first and second mold bodies
   inducing a material to flow in the space between the mold bodies, the flowable material subsequently becoming substantially non-flowable, and
   retracting the third mold body and separating the first and second mold bodies to release a wind turbine blade.

2. The method of example 1 wherein the third mold body is retracted after the first and second mold bodies are separated.

3. The method of example 1 wherein the third mold body is tapered to facilitate retracting the third mold body.

4. The method of example 1 and further comprising forming mounting holes in the wind turbine blade.

5. A method comprising:
   introducing a flowable material in a space between two wind turbine blade mold bodies and a third retractable mold body;
   allowing the flowable material to become substantially non-flowable;
   retracting the third mold body; and
   removing the wind turbine blade from the two wind turbine blade mold bodies.

6. The method of example 5 wherein the third mold body is retracted from a rootward portion of the wind turbine blade.

7. The method of example 6 wherein the third mold body is tapered from the rootward portion of the wind turbine blade toward a tipward portion of the wind turbine blade.

8. The method of example 5 wherein the flowable material is formed of at least one of thermoplastic resin, fiber-reinforced thermoplastic resin, thermoset resin, and fiber-reinforced thermoset resin.

9. The method of example 5 and further comprising providing cooling fluid inside the wind turbine blade mold halves to remove heat generated in performance of the method.

10. The method of example 5 wherein at least one of the first two mold bodies further comprises at least one pin positioned to stabilize the third mold body while the material flows.

11. The method of example 5 wherein the shape of the third mold body is calculated to provide a blade wall thickness sufficient to maintain blade integrity under maximum projected stress conditions and tapered sufficiently to allow retraction.

12. A wind turbine blade comprising:
a rootward portion;
a tipward portion extending from the roodward portion; and
a tapered cavity extending from the rootward portion and tapering continuously toward the tipward portion, wherein the wind turbine blade is formed as a single piece of molded material.

13. The wind turbine blade of example 12 wherein the blade twists from the rootward portion toward the tipward portion and the tapered cavity twists in conjunction with the twist of the blade.

14. The wind turbine blade of example 12 wherein the blade is formed of a thermoplastic resin.

15. The wind turbine blade of example 14 wherein the blade is formed of at least one of glass fiber filled polypropylene, glass fiber filled polyester, and carbon fiber filled polyester.

16. The wind turbine blade of example 12 wherein the blade is a single molded piece.

17. The wind turbine blade of example 12 wherein the blade is from one to two meters in length.

18. The wind turbine blade of example 12 and further comprising openings near mid-span communicating with the tapered cavity on substantially opposing sides of the blade.

19. The wind turbine blade of example 12 wherein the blade is formed of UV-stabilized 30% glass-filled polypropylene.

20. A mold set for forming a wind turbine blade, the set comprising:
a first mold body;
a second mold body, formed to be brought into proximity with the first mold half to form a wind turbine blade mold; and
a tapered retractable third mold body for positioning between the first and second mold bodies to form a cavity in a wind turbine blade formed in the wind turbine blade mold.

The invention claimed is:

1. A method of forming a wind turbine blade, the method comprising:
bringing a first mold body into proximity with a second mold body;
positioning a third, retractable mold body between the first and second mold bodies;
inducing a molten resin material to flow in the space between the mold bodies, via an injection molding machine, the flowable material subsequently becoming substantially non-flowable, and
retracting the third mold body and separating the first and second mold bodies to release the wind turbine blade, and wherein at least one of the first two mold bodies further comprises at least one pin positioned to stabilize the third mold body while the molten resin material flows.

2. The method of claim 1 wherein the third mold body is retracted after the first and second mold bodies are separated.

3. The method of claim 1 wherein the third mold body is tapered to facilitate retracting the third mold body.

4. The method of claim 1 and further comprising forming mounting holes in the wind turbine blade.

5. A method comprising:
introducing a flowable material in a space between two wind turbine blade injection mold bodies and a third retractable injection mold body;
allowing the flowable material to become substantially non-flowable;
retracting the third injection mold body; and
removing the wind turbine blade from the two wind turbine blade injection mold bodies and wherein the shape of the third mold body is calculated to provide a blade wall thickness sufficient to maintain blade integrity under maximum projected stress conditions and tapered sufficiently to allow retraction.

6. The method of claim 5 wherein the third mold body is retracted from a rootward portion of the wind turbine blade.

7. The method of claim 6 wherein the third mold body is tapered from the rootward portion of the wind turbine blade toward a tipward portion of the wind turbine blade.

8. The method of claim 5 wherein the flowable material is formed of at least one of thermoplastic resin, fiber-reinforced thermoplastic resin, thermoset resin, and fiber-reinforced thermoset resin.

9. The method of claim 5 and further comprising providing cooling fluid inside the wind turbine blade mold halves to remove heat generated in performance of the method.

10. A method comprising:
introducing a flowable material in a space between two wind turbine blade injection mold bodies and a third retractable injection mold body;
allowing the flowable material to become substantially non-flowable;
retracting the third injection mold body; and
removing the wind turbine blade from the two wind turbine blade injection mold bodies wherein at least one of the first two mold bodies further comprises at least one pin positioned to stabilize the third mold body while the material flows.

11. The method of claim 10 wherein the third mold body is retracted from a rootward portion of the wind turbine blade.

12. The method of claim 10 wherein the third mold body is tapered from the rootward portion of the wind turbine blade toward a tipward portion of the wind turbine blade.

13. The method of claim 10 wherein the flowable material is formed of at least one of thermoplastic resin, fiber-reinforced thermoplastic resin, thermoset resin, and fiber-reinforced thermoset resin.

14. The method of claim 10 and further comprising providing cooling fluid inside the wind turbine blade mold halves to remove heat generated in performance of the method.

15. A mold set for forming a wind turbine blade, the set comprising:
- a first injection mold body;
- a second injection mold body, formed to be brought into proximity with the first mold half to form a wind turbine blade mold; and
- a tapered retractable third injection mold body for positioning between the first and second mold bodies to form a cavity in the wind turbine blade formed in the wind turbine blade mold, and wherein at least one of the first and second injection mold bodies further comprises at least one pin positioned to stabilize the third injection mold body while the material flows.

* * * * *